(12) United States Patent
Shao et al.

(10) Patent No.: US 12,452,843 B2
(45) Date of Patent: Oct. 21, 2025

(54) CONTROL INFORMATION TRANSMISSION METHOD AND APPARATUS, COMMUNICATION NODE, AND STORAGE MEDIUM

(71) Applicant: ZTE CORPORATION, Guangdong (CN)

(72) Inventors: Shijia Shao, Guangdong (CN); Chuangxin Jiang, Guangdong (CN); Shujuan Zhang, Guangdong (CN); Zhaohua Lu, Guangdong (CN); Huahua Xiao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 394 days.

(21) Appl. No.: 18/021,952

(22) PCT Filed: Aug. 19, 2021

(86) PCT No.: PCT/CN2021/113489
§ 371 (c)(1),
(2) Date: Feb. 17, 2023

(87) PCT Pub. No.: WO2022/037637
PCT Pub. Date: Feb. 24, 2022

(65) Prior Publication Data
US 2023/0354274 A1 Nov. 2, 2023

(30) Foreign Application Priority Data
Aug. 19, 2020 (CN) .......................... 202010838938.6

(51) Int. Cl.
*H04W 72/044* (2023.01)
*H04L 5/00* (2006.01)
(Continued)

(52) U.S. Cl.
CPC .......... *H04W 72/044* (2013.01); *H04L 5/0012* (2013.01); *H04W 72/21* (2023.01); *H04W 72/232* (2023.01)

(58) Field of Classification Search
CPC ....... H04L 1/08; H04L 5/0012; H04L 5/0053; H04L 5/0078; H04L 5/0094;
(Continued)

(56) References Cited

U.S. PATENT DOCUMENTS 11,224,034 B2 * 1/2022 Nam .................... H04W 72/21
11,350,391 B2 * 5/2022 Chatterjee ............ H04L 1/1861
(Continued)

FOREIGN PATENT DOCUMENTS

CN 110536450 A 12/2019
CN 111278115 A 6/2020
(Continued)

OTHER PUBLICATIONS

VIVO, "Discussion on enhancement on PDCCH, PUCCH, PUSCH in MTRP scenario," R1-2005364, 3GPP TSG RAN WG1 #102-e, Agenda Item: 8.1.2.1: 12 pages (Aug. 2020).
(Continued)

*Primary Examiner* — Eric Nowlin
(74) *Attorney, Agent, or Firm* — KDW Firm PLLC

(57) ABSTRACT

Provided are a control information transmission method and apparatus, a communication node, and a storage medium. The method includes the following: acquiring downlink control information, where the downlink control information is configured to indicate at least two target uplink control channel resources in a target resource set; and transmitting uplink control information based on the target uplink control channel resources.

20 Claims, 6 Drawing Sheets

Acquire downlink control information, where the downlink control information is configured to indicate at least two target uplink control channel resources in a target resource set ~110

Transmit uplink control information based on the at least two target uplink control channel resources ~120

(51) Int. Cl.
*H04W 72/21* (2023.01)
*H04W 72/232* (2023.01)

(58) Field of Classification Search
CPC .......... H04W 72/044; H04W 72/0446; H04W 72/046; H04W 72/21; H04W 72/232
See application file for complete search history.

(56) References Cited

U.S. PATENT DOCUMENTS

| | | | | |
|---|---|---|---|---|
| 11,382,076 | B2* | 7/2022 | Cheng | H04W 72/23 |
| 11,398,930 | B2* | 7/2022 | Kwak | H04W 80/02 |
| 11,405,071 | B2* | 8/2022 | Matsumura | H04W 72/21 |
| 11,451,350 | B2* | 9/2022 | Choi | H04W 72/0453 |
| 11,497,004 | B2* | 11/2022 | Matsumura | H04J 13/20 |
| 11,563,532 | B2* | 1/2023 | Matsumura | H04L 5/0094 |
| 11,638,240 | B2* | 4/2023 | Park | H04W 72/23 370/336 |
| 11,638,275 | B2* | 4/2023 | Kim | H04W 72/0446 370/329 |
| 11,985,674 | B2* | 5/2024 | Chatterjee | H04W 72/0453 |
| 11,991,700 | B2* | 5/2024 | Matsumura | H04W 72/21 |
| 12,040,930 | B2* | 7/2024 | Park | H04L 1/1896 |
| 12,082,238 | B2* | 9/2024 | Jung | H04W 72/23 |
| 12,171,013 | B2* | 12/2024 | Hosseini | H04L 5/0055 |
| 12,200,710 | B2* | 1/2025 | Gao | H04L 5/0053 |
| 12,218,761 | B2* | 2/2025 | Hosseini | H04W 72/21 |
| 12,273,189 | B2* | 4/2025 | Bhamri | H04W 72/1268 |
| 12,284,653 | B2* | 4/2025 | Fakoorian | H04B 1/713 |
| 2018/0323932 | A1* | 11/2018 | Huang | H04L 5/0012 |
| 2019/0182824 | A1* | 6/2019 | Chatterjee | H04L 5/0053 |
| 2019/0222254 | A1* | 7/2019 | Kim | H04L 5/10 |
| 2019/0261356 | A1* | 8/2019 | Myung | H04W 48/12 |
| 2019/0349964 | A1* | 11/2019 | Liou | H04B 7/0626 |
| 2020/0008231 | A1 | 1/2020 | Vilaipornsawai et al. | |
| 2020/0145144 | A1* | 5/2020 | Hosseini | H04L 5/0055 |
| 2020/0205150 | A1* | 6/2020 | Cheng | H04W 72/21 |
| 2020/0221446 | A1* | 7/2020 | Nam | H04W 72/0446 |
| 2020/0221448 | A1* | 7/2020 | Park | H04W 80/08 |
| 2020/0280338 | A1* | 9/2020 | Matsumura | H04W 72/21 |
| 2020/0304274 | A1* | 9/2020 | Matsumura | H04L 5/0092 |
| 2020/0305146 | A1* | 9/2020 | Matsumura | H04W 72/21 |
| 2020/0351129 | A1* | 11/2020 | Kwak | H04W 72/53 |
| 2020/0351891 | A1* | 11/2020 | Hosseini | H04L 1/1819 |
| 2020/0374057 | A1* | 11/2020 | Matsumura | H04L 5/0044 |
| 2020/0389204 | A1* | 12/2020 | Matsumura | H04L 5/0044 |
| 2021/0037519 | A1* | 2/2021 | Matsumura | H04J 13/0074 |
| 2021/0307051 | A1* | 9/2021 | Chatterjee | H04W 72/0453 |
| 2021/0345362 | A1* | 11/2021 | Kim | H04L 5/0064 |
| 2022/0086032 | A1* | 3/2022 | Park | H04W 72/0446 |
| 2022/0248411 | A1* | 8/2022 | Jung | H04B 7/06 |
| 2022/0295452 | A1* | 9/2022 | Tsai | H04L 5/0094 |
| 2022/0386300 | A1* | 12/2022 | Gao | H04W 72/0446 |
| 2023/0039825 | A1* | 2/2023 | Khoshnevisan | H04L 5/001 |
| 2023/0209509 | A1* | 6/2023 | Khoshnevisan | H04W 52/08 370/329 |
| 2023/0239878 | A1* | 7/2023 | Deghel | H04L 1/08 370/329 |
| 2023/0276449 | A1* | 8/2023 | Yang | H04L 5/0055 |
| 2024/0089026 | A1* | 3/2024 | Bhamri | H04W 72/00 |
| 2024/0113814 | A1* | 4/2024 | Li | H04L 1/1854 |
| 2024/0284460 | A1* | 8/2024 | Abdelghaffar | H04W 72/232 |
| 2024/0323963 | A1* | 9/2024 | Fakoorian | H04L 1/1896 |

FOREIGN PATENT DOCUMENTS

| | | |
|---|---|---|
| CN | 111601339 A | 8/2020 |
| CN | 111988857 A | 11/2020 |
| WO | 2019137213 A1 | 7/2019 |
| WO | 2020073283 A1 | 4/2020 |

OTHER PUBLICATIONS

Extended European Search Report for EP Application No. 21857729.4, dated Aug. 26, 2024, 11 pages.
Chinese Search Report for CN Application No. 202010838938.6, dated Dec. 19, 2024, 2 pages.
Chinese Office Action for CN Application No. 202010838938.6, dated Dec. 25, 2024, 6 pages.
International Search Report mailed Nov. 4, 2021, for Application No. PCT/CN2021/113489 (four (4) pages).
Qualcomm Incorporated, "Enhancements on Multi-TRP for PDCCH, PUCCH and PUSCH", 3GPP TSG-RAN WG1 Meeting #102-e R1-2006791 e-Meeting, Aug. 17-28, 2020.

* cited by examiner

CONTROL INFORMATION TRANSMISSION METHOD AND APPARATUS, COMMUNICATION NODE, AND STORAGE MEDIUM

CROSS-REFERENCE TO RELATED APPLICATIONS

This is a National Stage Application, filed under 35 U.S.C. 371, of International Patent Application No. PCT/CN2021/113489, filed on Aug. 19, 2021, which is based on and claims priority to Chinese Patent Application No. 202010838938.6 filed with the China National Intellectual Property Administration (CNIPA) on Aug. 19, 2020, the disclosure of which is incorporated herein by reference in its entirety.

TECHNICAL FIELD

The present application relates to wireless communication networks, for example, a control information transmission method and apparatus, a communication node, and a storage medium.

BACKGROUND

In an enhanced mobile broadband (eMBB) scenario, the joint transmission technology of multiple transmission and reception points (multi-TRP) effectively improves the transmission throughput of long-term evolution (LTE), long term evolution advanced (LTE-A), and new radio (NR) access technology by using multi-TRP transmission. Another scenario for NR enhancement is ultra-reliable low-latency communications (URLLC), where a common and efficient way to ensure transmission reliability is to repeat transmissions. At the same time, to obtain the beam diversity gain, more uplink control channel resources need to be indicated for transmitting uplink control information (UCI). If the UCI is transmitted through only one uplink control channel resource with a single beam, the flexibility of UCI transmission is poor.

SUMMARY

The present application provides a control information transmission method and apparatus, a communication node, and a storage medium to improve the flexibility and diversity gain of uplink control information transmission.

Embodiments of the present application provide a control information transmission method. The method includes acquiring downlink control information (DCI), where the DCI is configured to indicate at least two target uplink control channel resources in a target resource set, and transmitting uplink control information based on the target unlink control channel resources.

Embodiments of the present application also provide a control information transmission apparatus, including an acquisition module configured to acquire downlink control information, where the downlink control information is configured to indicate at least two target uplink control channel resources in a target resource set, and a transmission module configured to transmit uplink control information based on the target uplink control channel resources.

Embodiments of the present application also provide a communication node, including one or more processors configured to perform, upon execution, the preceding control information transmission method.

Embodiments of the present application also provide a computer-readable storage medium storing a computer program which, when executed by a processor, causes the processor to perform the preceding control information transmission method.

DETAILED DESCRIPTION

The present application is described in conjunction with drawings and embodiments.

In NR, a physical uplink control channel (PUCCH) is used for transmitting uplink control information (UCI), such as channel state information (CSI), a hybrid automatic repeat request (HARQ), and a scheduling request (SR).

To obtain a space diversity gain, information may be transmitted through multiple beams. Which kind of beam is in use depends on a beam indication in beam management. When a communication node on the network side adopts analog beamforming for downlink transmission, a serial number of the downlink analog transmission beam selected by a user equipment (UE) needs to be indicated. For an uplink beam indication of the PUCCH, PUCCH resources are first configured. Different PUCCH resources are semi-statically configured with different transmission beam directions. By selecting the PUCCH resources, different transmission beam directions are selected to realize beam switching in multiple directions.

In a scenario where multi-TRP or multi-panel technology is adopted for control information transmission, more uplink control channel resources (that is, PUCCH resources) need to be indicated for the transmission of repeatedly sent UCI. Therefore, it is difficult to obtain the beam diversity gain by transmitting the UCI through only one uplink control channel resource, and the flexibility of the UCI transmission is poor.

Embodiments of the present application provide a control information transmission method applied to a communication node. The communication node may be on the network side, for example, a base station. The base station may receive UCI based on target uplink control channel resources. Alternatively, the communication node may be on the user side, for example, a UE. The UE may send UCI based on target uplink control channel resources. This method may be applied to a scenario of multi-TRP, that is, a wireless communication system includes one UE and at least two transmission and reception points. Or this method may be applied to a scenario of multi-panel technology, that is, the UE contains at least one panel in the case of one TRP.

Figure 1:
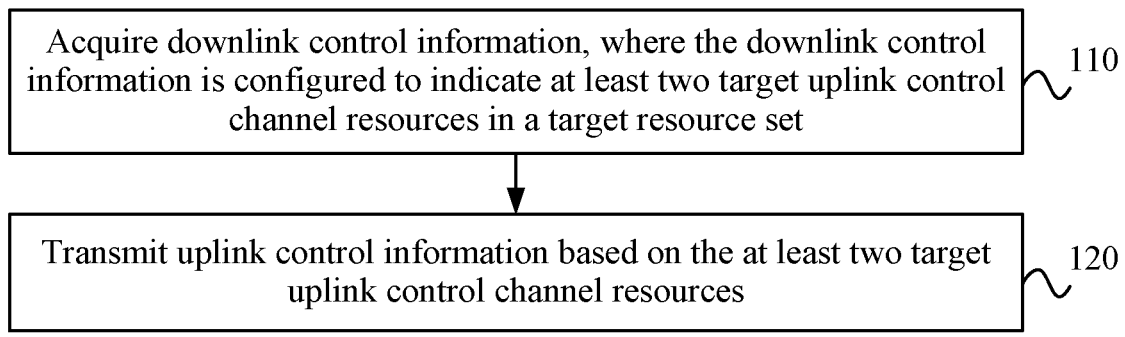
FIG. 1 is a flowchart of a control information transmission method according to an embodiment.

FIG. 1 is a flowchart of a control information transmission method according to an embodiment. As shown in FIG. 1, the method provided in this embodiment includes 110 and 120.

In 110, downlink control information is acquired, where the downlink control information is configured to indicate at least two target uplink control channel resources in a target resource set.

In 120, uplink control information is transmitted based on the target unlink control channel resources.

In this embodiment, the base station sends DCI to the UE, and at least two target uplink control channel resources (that is, at least two target PUCCH resources) indicated by the DCI in the target resource set are used to transmit the UCI. In this embodiment, the target resource set is a PUCCH resource set selected based on the size of the UCI, including one or more PUCCH resources. The target PUCCH resource is the PUCCH resource actually used to transmit the UCI.

For example, there are at least two target resource sets. From each target resource set, one PUCCH resource is indicated as a target PUCCH resource, thereby acquiring at least two target PUCCH resources; or there may be one target resource set from which one group of (at least two) PUCCH resources may be indicated as target PUCCH resources.

In the control information transmission method of this embodiment, at least two target PUCCH resources in the target resource set are indicated by the DCI for transmitting UCI, thereby improving the transmission diversity gain and flexibility of UCI.

In an embodiment, the target resource set is determined by the payload size of the UCI. At least one target resource set is provided. The target PUCCH resources are indicated by a PUCCH resource indicator (PRI) in the DCI.

In this embodiment, there are one or more target resource sets. The DCI may be used to indicate multiple target PUCCH resources in one target resource set, or may be used to indicate one target PUCCH resource separately in multiple target resource sets. On the basis of establishing radio resource control (RRC), the base station may configure multiple candidate resource sets for the UE through higher-layer RRC signaling. Each candidate resource set is used to carry UCI with different payloads. The target resource set is determined from the candidate resource sets according to the payload size of UCI.

In an embodiment, the method further includes the following: one target resource set is determined according to the payload size of UCI, where PUCCH resources in the one target resource set are divided into at least two groups, and a PRI is used to indicate that one group of PUCCH resources in the one target resource set serve as the target PUCCH resources.

In this embodiment, one target resource set is determined according to the payload size of UCI. The target resource set includes multiple PUCCH resources. When the multiple PUCCH resources in the target resource set are paired, n new uplink control channel resource groups (PUCCH resource groups) are generated.

For example, Table 1 is a grouping table of PUCCH resources in a target resource set. In Table 1, when the PRI indicates 000, the target PUCCH resources are PUCCH resource 0 and PUCCH resource 4 corresponding to PUCCH resource group 0. In this case, transmission beams for transmitting the UCI and time-frequency domain resources and beams for uplink are determined according to the PUCCH resource 0 and target PUCCH resource 4 respectively, and multi-beam transmission may be performed. When the PRI indicates 110, the target PUCCH resource is PUCCH resource 0 corresponding to PUCCH resource group 6. In this case, transmission beams for transmitting the UCI and time-frequency domain resources and beams for uplink are independently determined by the target PUCCH resource 0.

TABLE 1

Grouping table of PUCCH resources in a target resource set

| PRI Activation Status | Index of PUCCH Resource Group | Index of PUCCH Resource | Index of PUCCH Resource |
|---|---|---|---|
| 000 | 0 | 0 | 4 |
| 001 | 1 | 1 | 5 |
| 010 | 2 | 2 | 6 |
| 011 | 3 | 3 | 7 |
| 100 | 4 | 4 | 2 |
| 101 | 5 | 5 | 3 |
| 110 | 6 |   | 0 |
| 111 | 7 |   | 7 |

In an embodiment, the method further includes the following: at least two target resource sets are determined according to the payload size of UCI, and the PRI is used to indicate that one PUCCH resource in each target resource set serves as the target PUCCH resource.

In this embodiment, at least two target resource sets are determined according to the payload size of UCI, that is, the number of PUCCH resource sets is extended. The maximum number of candidate resource sets configured through the RRC may exceed four. And the payload size among different candidate resource sets may overlap. In a process of selecting the target resource set according to the payload size of UCI, two or more candidate resource sets may be selected as the target resource sets at the same time, and one target PUCCH resource is determined from each target resource set according to the indication of the PRI.

In an embodiment, the method also includes 101.

In 101, a candidate resource set is associated with a first higher-layer parameter, and the target resource set belongs to the candidate resource set. Candidate resource sets are respectively configured by different transmission nodes.

In this embodiment, in a multi-TRP transmission scenario, the configuration of candidate resource sets is associated with the first higher-layer parameter (that is, CORESETPoolIndex), and one to four PUCCH resource sets may be configured under each CORESETPoolIndex as the candidate resource set. The target resource set is determined by the communication node from the candidate resource sets according to the payload size of UCI. In some embodiments, the number of candidate resource sets may also be extended, that is, the number of candidate resource sets may exceed four.

Figure 2:
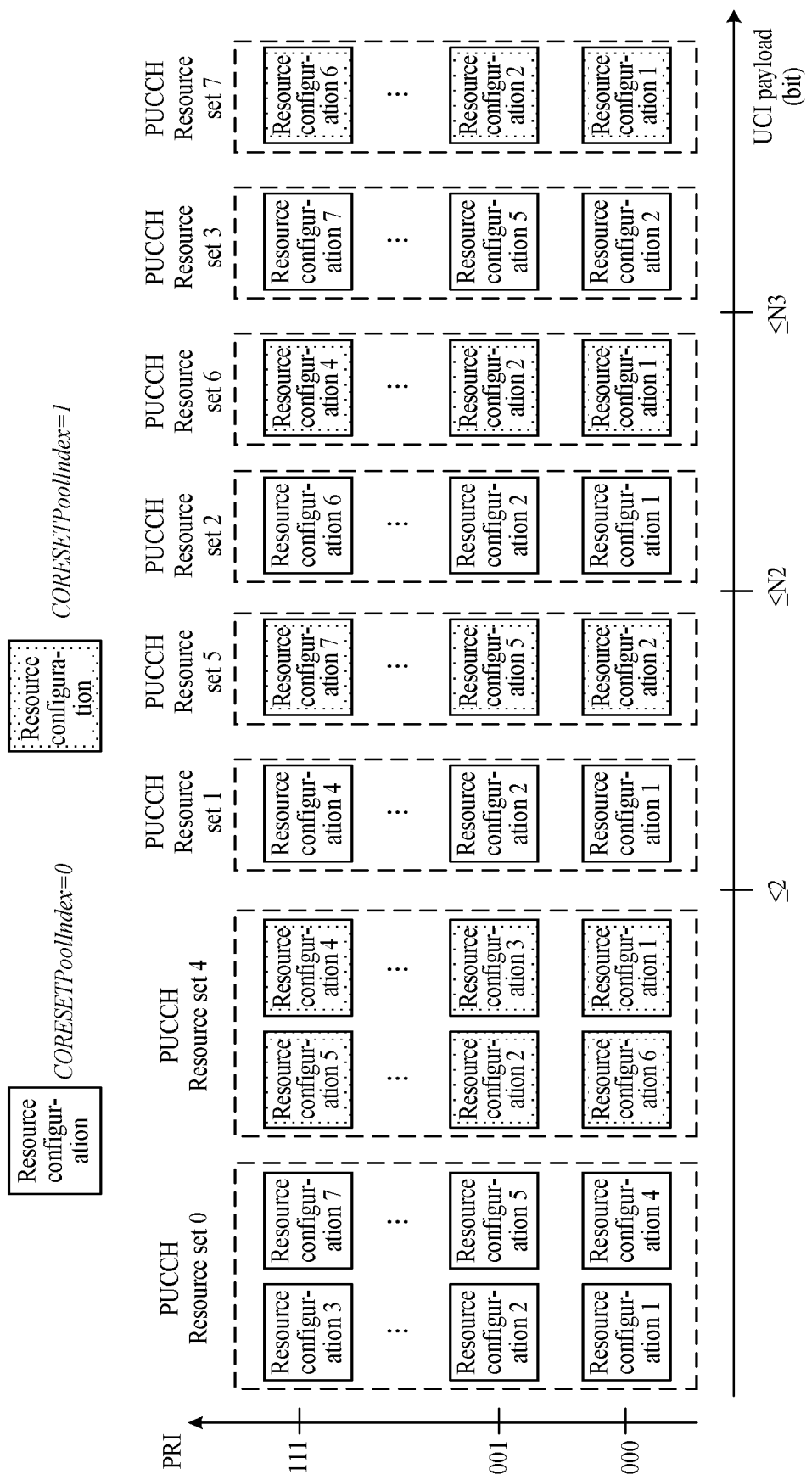
FIG. 2 is a diagram illustrating a situation in which a first higher-layer parameter associates with a candidate resource set according to an embodiment.

FIG. 2 is a diagram illustrating a situation in which a first higher-layer parameter associates with a candidate resource set according to an embodiment. As shown in FIG. 2, for CORESETPoolIndex=0, PUCCH resource set 0, PUCCH resource set 1, PUCCH resource set 2, and PUCCH resource set 3 are configured; and for CORESETPoolIndex=1, PUCCH resource set 4, PUCCH resource set 5, PUCCH resource set 6, and PUCCH resource set 7 are configured. When the number of bits in the payload of UCI is greater than 2 and smaller than N22, the communication node may select two PUCCH resource sets from the candidate resource sets, that is, PUCCH resource set 1 and PUCCH resource set 5, and then select PUCCH resources according to the indication of the PRI in the DCI. For example, when the PRI indicates 001, PUCCH resource 2 and PUCCH resource 5 are adopted as the target PUCCH resources, and uplink transmission is performed according to related resource configurations.

In an embodiment, the DCI is also configured to indicate the number of transmission repetitions of the target PUCCH resources.

In this embodiment, to improve the coverage and transmission reliabilities of data or signaling, transmission repetitions may be performed on the target PUCCH resources, which may also be understood as using the target PUCCH resources to repeatedly transmit the same UCI. Time-division multiplexing is adopted within the transmission repetitions. The number of transmission repetitions of the target PUCCH resources may be indicated through the DCI, improving the flexibility of indication for the repetition transmission.

In an embodiment, the method also includes the following.

The DCI dynamically indicates one value of the number of transmission repetitions. The number of transmission repetitions is the total number of transmission repetitions of the target PUCCH resources. The total number is the sum of the respective number of transmission repetitions of each target PUCCH resource. The target PUCCH resources are not transmitted repeatedly by default in a case where the DCI does not indicate the number of transmission repetitions.

In this embodiment, the number of transmission repetitions dynamically indicated by the DCI is N. N is the sum of the respective number of transmission repetitions of each target PUCCH resource. For example, when the target PUCCH resources indicated by the PRI are PUCCH resource 0 and PUCCH resource 1, PUCCH resource 0 is repeatedly transmitted N/2 times, and PUCCH resource 1 is repeatedly transmitted N/2 times, where N is an integer greater than or equal to 2. If the DCI does not indicate the number N of transmission repetitions, the target PUCCH resources are not repeatedly transmitted by default, that is, one of the target PUCCH resources is used to transmit the UCI once.

It should be noted that PUCCH resource 0 and PUCCH resource 1 are only used to distinguish different target PUCCH resources, "0" and "1" do not indicate the indexes of the target PUCCH resources, and the indexes of the target PUCCH resources may be other values.

In an embodiment, the method also includes the following.

The DCI dynamically indicates one value of the number of transmission repetitions. The number of transmission repetitions is the number of transmission repetitions of each PUCCH resource in the target PUCCH resources. The target PUCCH resources are not transmitted repeatedly by default in a case where the DCI does not indicate the number of transmission repetitions.

In this embodiment, the number of transmission repetitions dynamically indicated by the DCI is N. N is the number of transmission repetitions of each PUCCH resource. For example, when the target PUCCH resources indicated by the PRI are PUCCH resource 0 and PUCCH resource 1, PUCCH resource 0 is repeatedly transmitted N times, and PUCCH resource 1 is repeatedly transmitted N times, where N is an integer greater than or equal to 1. If the DCI does not indicate the number N of transmission repetitions, the target PUCCH resources are not repeatedly transmitted by default, that is, one of the target PUCCH resources is used to transmit the UCI once.

In an embodiment, the number of transmission repetitions of the target PUCCH resources is configured by a second higher-layer parameter. The second high-level parameter is used to configure the number of transmission repetitions of each PUCCH resource or the number of transmission repetitions corresponding to a PUCCH resource set, where this number of transmission repetitions is applied to transmission of each PUCCH resource in the PUCCH resource set.

In this embodiment, the second higher-layer parameter may be configured for each PUCCH resource by using an original higher-layer parameter (for example, marked as nrofSlots) or by introducing a new higher-layer parameter. For example, when the target PUCCH resources indicated by the PRI are PUCCH resource 0 and PUCCH resource 1, the second higher-layer parameter configures the number M1 of transmission repetitions for PUCCH resource 0 and configures the number M2 of transmission repetitions for PUCCH resource 1, then PUCCH resource 0 is repeatedly transmitted M1 times, and PUCCH resource 1 is repeatedly transmitted M2 times.

In this embodiment, the second higher-layer parameter may be configured for each PUCCH resource set by using the original higher-layer parameter (for example, marked as nrofSlots) or by introducing the new higher-layer parameter. For example, when the second higher-layer parameter configures the number M1 of transmission repetitions for PUCCH resource set 0 and configures the number M2 of transmission repetitions for PUCCH resource set 1, PUCCH resource 0 belongs to PUCCH resource set 0, and PUCCH resource 1 belongs to PUCCH resource set 1, then PUCCH resource 0 is repeatedly transmitted M1 times according to the configuration of PUCCH resource set 0, and PUCCH resource 1 is repeatedly transmitted M2 times according to the configuration of PUCCH resource set 1.

For another example, the second higher-layer parameter configures the number M0 of transmission repetitions for PUCCH resource set 0. If PUCCH resource 0 and PUCCH resource 1 are both from PUCCH resource set 0, PUCCH resource 0 and PUCCH resource 1 are repeatedly transmitted M0 times separately.

In an embodiment, the target PUCCH resources include a first resource and a second resource which overlap in the time domain.

In this embodiment, multiple target PUCCH resources indicated by the DCI may overlap in the time domain. Each of the following embodiments is described with reference to an example in which the target PUCCH resources include two PUCCH resources, the first resource (marked as PUCCH resource 0) and the second resource (marked as PUCCH resource 1). In a practical application, the target PUCCH resources may include more than two PUCCH resources.

In an embodiment, 120 includes the following:
transmitting the UCI in each slot through the first resource and the second resource, where for different slots, an overlapping symbol in the first resource or the second resource is dropped alternately; or dividing N transmissions of the target PUCCH resources into M groups, and transmitting the UCI in each slot through the first resource and the second resource, where for different groups, an overlapping symbol in the first resource or the second resource is dropped alternately, where N is an integer greater than or equal to 2, and M is an integer greater than or equal to 2.

In this embodiment, when intra-slot frequency hopping is configured, for an overlapping symbol of PUCCH resource 0 and PUCCH resource 1, the transmission may be performed only on one of the target PUCCH resources, and the other target PUCCH resource needs to drop the overlapping symbol. An implementation of dropping overlapping symbols may be to drop the overlapping symbol in PUCCH resource 0 or PUCCH resource 1 alternately in different slots, or to group the transmissions according to the number of transmission repetitions and drop the overlapping symbol in PUCCH resource 0 or PUCCH resource 1 in different groups alternately.

In an embodiment, when intra-slot frequency hopping is not configured, for two target PUCCH resources indicated by the DCI (marked as PUCCH resource 0 and PUCCH resource 1), similarly, the overlapping symbol may only be transmitted on one of the target PUCCH resources, and the other target PUCCH resource needs to drop the overlapping symbol. An implementation of dropping an overlapping symbol may be to drop the overlapping symbol of PUCCH resource 0 or PUCCH resource 1 alternately in different slots, or to group the transmissions according to the number of transmission repetitions and drop the overlapping symbol in PUCCH resource 0 or PUCCH resource 1 in different groups alternately.

Figure 3:
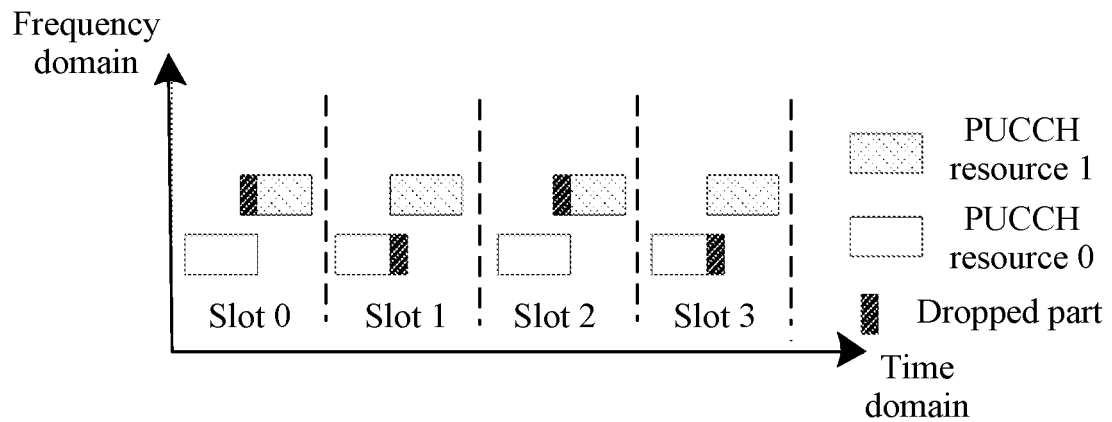
FIG. 3 is a diagram illustrating a situation in which overlapping symbols of different target uplink control channel resources are dropped alternately when an overlap occurs in the time domain and intra-slot frequency hopping is configured according to an embodiment.

FIG. 3 is a diagram illustrating a situation in which overlapping symbols of different target uplink control channel resources are dropped alternately when an overlap occurs in the time domain and the intra-slot frequency hopping is configured according to an embodiment. As shown in FIG. 3, the two target PUCCH resources indicated by the DCI are PUCCH resource 0 and PUCCH resource 1, and the number of transmission repetitions indicated by the DCI or the second higher-layer parameter is N. For example, overlapping symbols in PUCCH resource 1 are dropped in even-numbered slots (or even-numbered transmission occasions); the overlapping symbols in PUCCH resource 0 are dropped in odd-numbered slots (or odd-numbered transmission occasions). In some embodiments, alternatively, the overlapping symbols of PUCCH resource 0 may be dropped first in the first even-numbered slot. The slots are numbered from 0.

Figure 4:
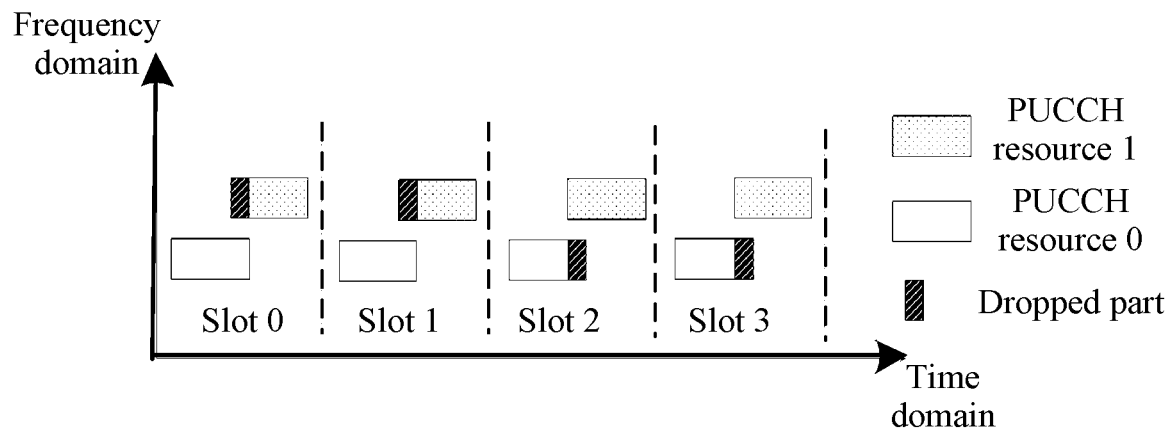
FIG. 4 is a diagram illustrating a situation in which overlapping symbols of target uplink control channel resources are dropped in groups when an overlap occurs in the time domain and intra-slot frequency hopping is configured according to an embodiment.

FIG. 4 is a diagram illustrating a situation in which overlapping symbols of target uplink control channel resources are dropped in groups when an overlap occurs in the time domain and the intra-slot frequency hopping is configured according to an embodiment. As shown in FIG. 4, the two target PUCCH resources indicated by the DCI are PUCCH resource 0 and PUCCH resource 1, and the number of transmission repetitions indicated by the DCI or the second higher-layer parameter is N. The N transmission repetitions are divided into M groups, and the case where N=4, and M=2 is taken as an example. In FIG. 4, transmission repetitions in two slots are regarded as one group. In even-numbered groups (for example, group 0, including slot 0 and slot 1), overlapping symbols of PUCCH resource 1 are dropped; in odd-numbered groups (for example, group 1, including slot 2 and slot 3), overlapping symbols of PUCCH resource 0 are dropped. In some embodiments, alternatively, the overlapping symbols of PUCCH resource 0 may be dropped first in the first even-numbered group. The groups are numbered from 0.

In an embodiment, 120 includes the following:
In different slots, the UCI is transmitted through the first resource or the second resource alternately; or N transmissions of the target PUCCH resources are divided into M groups, and in different groups, the UCI is transmitted through the first resource or the second resource alternately, where N is an integer greater than or equal to 2, and M is an integer greater than or equal to 2.

In this embodiment, only one PUCCH resource is transmitted in one slot, and for the overlapping part, one of the target PUCCH resources where the overlapping symbols are located needs to be dropped. For the two target PUCCH resources indicated by the DCI (marked as PUCCH resource 0 and PUCCH resource 1), an implementation of dropping the PUCCH resources where the overlapping symbols are located may be to alternately drop PUCCH resource 0 or PUCCH resource 1 in different slots, or to group the transmissions according to the number of transmission repetitions and alternately drop PUCCH resource 0 or PUCCH resource 1 in different groups.

Figure 5:
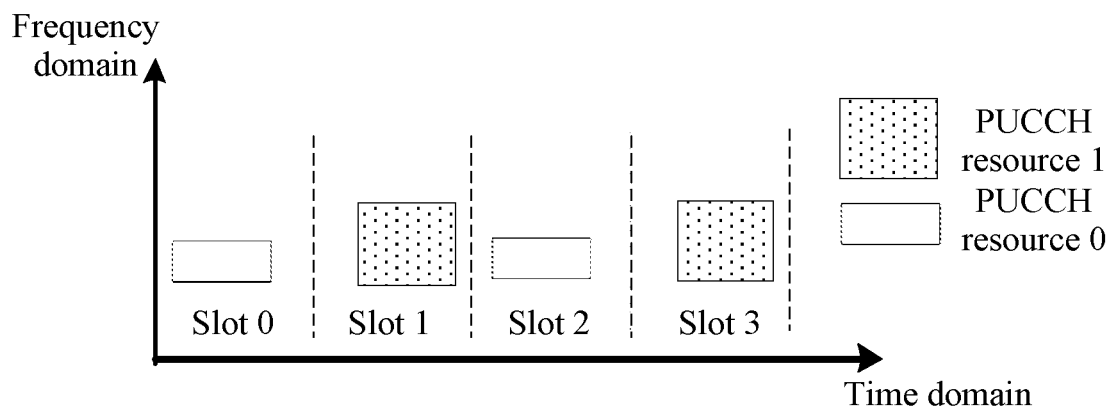
FIG. 5 is a diagram illustrating a situation in which different target uplink control channel resources are alternately transmitted in different slots according to an embodiment.

FIG. 5 is a diagram illustrating a situation in which different target uplink control channel resources are alternately transmitted in different slots according to an embodiment. In this embodiment, in different slots, PUCCH resource 0 or PUCCH resource 1 is dropped alternately. As shown in FIG. 5, PUCCH resource 0 and PUCCH resource 1 are indicated in the DCI, and the number of transmission repetitions indicated by the DCI or the second higher-layer parameter is N. For example, in even-numbered slots (or even-numbered transmission occasions), PUCCH resource 1 is dropped, and only PUCCH resource 0 is transmitted; in odd-numbered slots (or odd-numbered transmission occasions), PUCCH resource 0 is dropped, and only PUCCH resource 1 is transmitted. In some embodiments, PUCCH resource 1 may be dropped first in the first even-numbered slot. The slots are numbered from 0.

Figure 6:
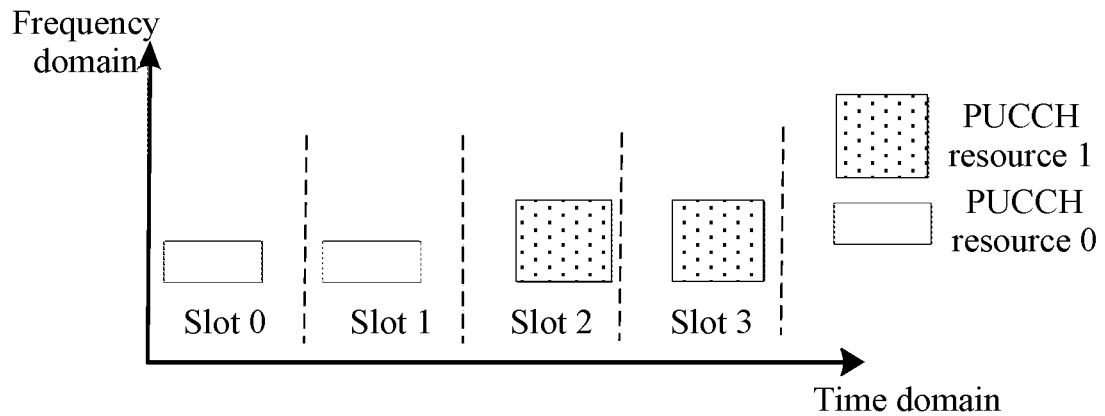
FIG. 6 is a diagram illustrating a situation in which different target uplink control channel resources are transmitted in groups in different slots according to an embodiment.

FIG. 6 is a diagram illustrating a situation in which different target uplink control channel resources are transmitted in groups in different slots according to an embodiment. In this embodiment, in different slots, PUCCH resource 0 or PUCCH resource 1 is dropped in groups. As shown in FIG. 6, the two target PUCCH resources indicated by the DCI are PUCCH resource 0 and PUCCH resource 1, and the number of transmission repetitions indicated by the DCI or the second higher-layer parameter is N. The N transmissions are divided into M groups, and the case where N=4, and M=2 is taken as an example. In FIG. 6, transmission repetitions in two slots are regarded as one group. In even-numbered groups (for example, group 0, including slot 0 and slot 1), PUCCH resource 1 is dropped, and only PUCCH resource 0 is transmitted; in odd-numbered groups (for example, group 1, including slot 2 and slot 3), PUCCH resource 0 is dropped, and only PUCCH resource 1 is transmitted. In some embodiments, alternatively, PUCCH resource 0 may be dropped first in the first even-numbered group. The groups are numbered from 0.

It should be noted that when the target PUCCH resources include more than two PUCCH resources and the overlap occurs in the time domain, the method where the communication node drops the overlapping symbols of different target PUCCH resources in different slots alternately, drops the overlapping symbols of different target PUCCH resources in groups, drops different target PUCCH resources alternately where the overlapping symbols are located, and drops different target PUCCH resources where overlapping symbols are located in groups in the above embodiments is also applicable.

In an embodiment, when the intra-slot frequency hopping is configured, for two target PUCCH resources (PUCCH resource 0 and PUCCH resource 1) indicated by the DCI, in one slot, the first frequency hopping unit corresponds to PUCCH resource 0, and the index of the physical resource block (PRB) may be indicated by the third higher-layer parameter (marked as StartingPRB); and the second frequency hopping unit corresponds to PUCCH resource 1, and the index of the PRB may be indicated by the fourth higher-layer parameter (marked as SecondPRB).

In an embodiment, the target PUCCH resources include a first resource and a second resource, and the number of transmission repetitions of the target PUCCH resources is semi-statically indicated only by a fifth higher-layer parameter.

In this implementation, the communication node may determine whether to transmit the UCI through different target PUCCH resources in different slots or to transmit the UCI through each target PUCCH resource in a slot according to the number of transmission repetitions semi-statically indicated by the fifth higher-layer parameter.

In an embodiment, 120 includes the operations described below.

In a case where the value of the fifth higher-layer parameter is 1, the UCI is transmitted through the first resource and the second resource within the same slot. In a case where the value of the fifth higher-layer parameter is greater than 1, inter-slot transmission repetitions are performed on the first resource and the second resource, and in different slots, the UCI is transmitted through the first resource or the second resource separately.

In this embodiment, the fifth higher-layer parameter is marked as nrofslots, and in a case where nrofslots=1, it is determined to transmit the UCI through the target PUCCH resources in the slot.

Figure 7:
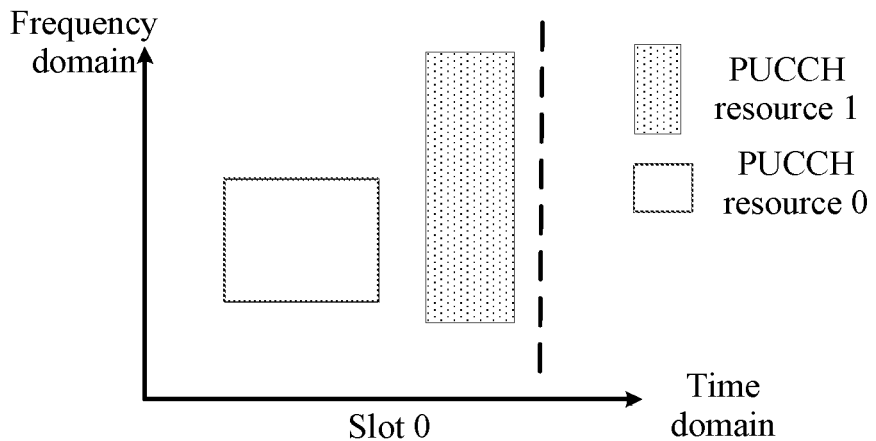
FIG. 7 is a diagram illustrating a situation in which target uplink control channel resources are transmitted in a slot according to an embodiment.

FIG. 7 is a diagram illustrating a situation in which target uplink control channel resources are transmitted within a slot according to an embodiment. As shown in FIG. 7, the UCI is transmitted through PUCCH resource 1 and PUCCH resource 0 within this slot.

In a case where nrofslots>1, it is determined to transmit the UCI through different target PUCCH resources in different slots.

Figure 8:
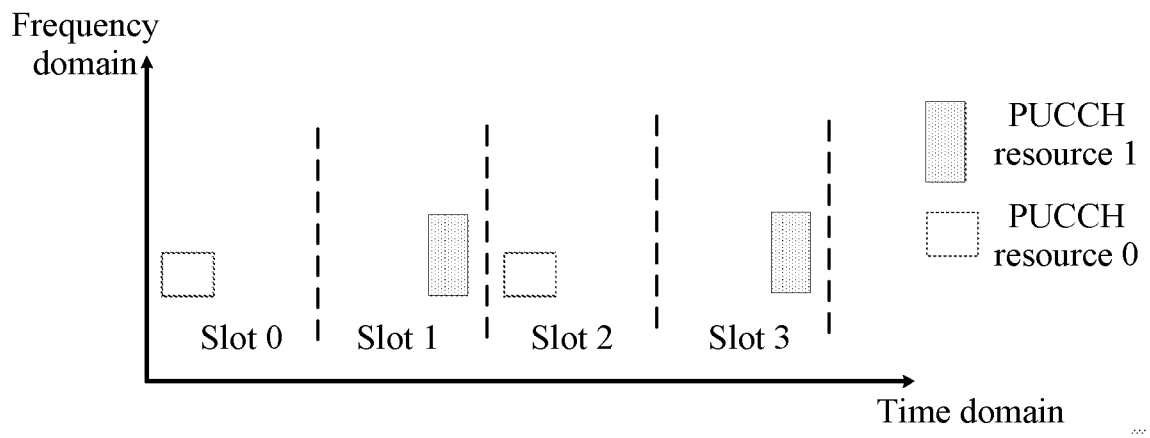
FIG. 8 is a diagram illustrating a situation in which target uplink control channel resources are alternately and repeatedly transmitted in different slots according to an embodiment.

FIG. 8 is a diagram illustrating a situation in which target uplink control channel resources are alternately and repeatedly transmitted in different slots according to an embodiment. As shown in FIG. 8, the communication node may perform inter-slot transmission repetitions according to the start symbol position (S) and duration (L) contained in the target PUCCH resources indicated by the PRI, and alternately repeat transmissions of different target PUCCH resources in different slots.

In an embodiment, the target PUCCH resources include a first resource and a second resource, and the number of transmission repetitions of the target PUCCH resources is jointly indicated by a fifth higher-layer parameter and the DCI.

In this implementation, for multiple target PUCCH resources indicated by the DCI, the communication node may determine whether to transmit the UCI through different target PUCCH resources in different slots or to transmit the UCI through each target PUCCH resource in a slot according to the number of transmission repetitions jointly indicated by the fifth higher-layer parameter and the DCI.

In an embodiment, 120 includes the operations described below.

In a case where the number of transmission repetitions indicated by the fifth higher-layer parameter is equal to N and the number of transmission repetitions indicated by the downlink control information is twice the number of transmission repetitions indicated by the fifth higher-layer parameter, the uplink control information is transmitted in the same slot through the first resource and the second resource, and inter-slot transmission repetitions are performed on N slots.

In a case where the number of transmission repetitions indicated by the fifth higher-layer parameter is equal to the number of transmission repetitions indicated by the downlink control information, inter-slot transmission repetitions are performed on the first resource and the second resource, and in different slots, the UCI is transmitted through the first resource or the second resource separately.

In a case where the number of transmission repetitions indicated by the downlink control information is not twice the number of transmission repetitions indicated by the fifth higher-layer parameter, and the number of transmission repetitions indicated by the downlink control information is not equal to the number of transmission repetitions indicated by the fifth higher-layer parameter, the uplink control information is transmitted in different slots through the first resource or the second resource separately, and inter-slot transmission repetitions are performed on the first resource and the second resource, where the number of transmission repetitions is determined by the downlink control information.

In this embodiment, the fifth higher-layer parameter is marked as nrofslots, and in a case where nrofslots=N and the number of transmission repetitions dynamically indicated by the DCI is 2N, the communication node performs transmission through each target PUCCH resource in each slot and performs the inter-slot transmission repetitions on N slots.

Figure 9:
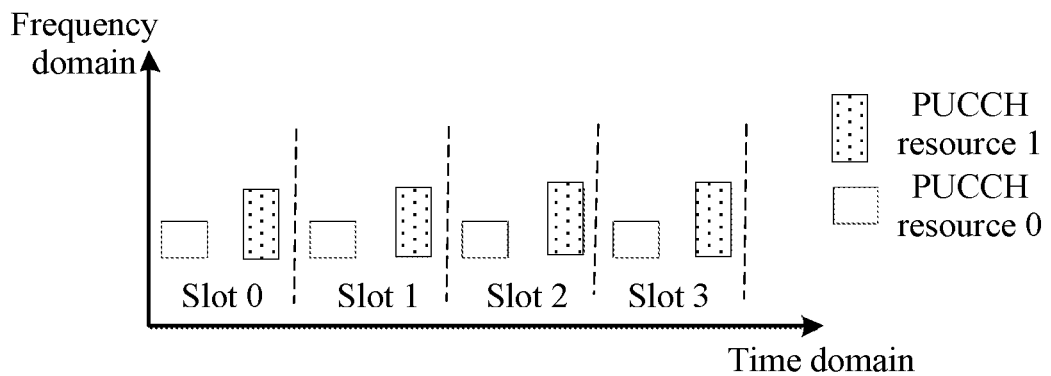
FIG. 9 is a diagram illustrating a situation in which transmissions are performed in slots through target uplink control resources and inter-slot transmission repetitions are performed according to an embodiment.

FIG. 9 is a diagram illustrating a situation in which transmissions are performed in slots through target uplink control resources and inter-slot transmission repetitions are performed according to an embodiment. An example where N is equal to 4 is taken in FIG. 9. In a case where nrofslots=N and the number of transmission repetitions dynamically indicated by the DCI is 2N, the UCI is transmitted through each target PUCCH resource in each slot, and the inter-slot transmission repetitions are performed.

In a case where nrofslots=N, and the number of transmission repetitions dynamically indicated by the DCI is also N, the communication node performs transmissions through different target PUCCH resources on the N slots separately.

In a case where the number of transmission repetitions dynamically indicated by the DCI is not twice and not equal to nrofslots, or the parameter nrofslots is not indicated, the communication node may alternately and repeatedly transmit different target PUCCH resources in different slots according to the start symbol position (S) and duration (L) of the target PUCCH resources indicated by the PRI, and the number of transmission repetitions is indicated by the DCI.

In an embodiment, the target PUCCH resources include a first resource and a second resource, and the number of transmission repetitions of the target PUCCH resources is only indicated by the DCI. In a case where the number of transmission repetitions dynamically indicated by the DCI is 1, the UCI is transmitted once through the first resource or the second resource. In a case where the number of transmission repetitions dynamically indicated by the DCI is 2, in response to the absence of a time domain overlap between the first resource and the second resource, the UCI is transmitted in the same slot through the first resource and the second resource. In a case where the number of transmission repetitions dynamically indicated by the DCI is 2, in response to the existence of a time domain overlap between the first resource and the second resource, inter-slot transmission repetitions are performed on the first resource and the second resource, and in different slots, the UCI is transmitted through the first resource or the second resource separately (for example, the UCI is transmitted through the first resource in time slot 0 and through the second resource in time slot 1). In a case where the number of transmission repetitions dynamically indicated by the DCI is greater than 2, inter-slot transmission repetitions are performed on the first resource and the second resource, and in different slots, the UCI is transmitted through the first resource or the second resource separately.

It should be noted that when the target PUCCH resources include more than two PUCCH resources, the method where the communication node transmits UCI through different target PUCCH resources in different slots, and transmits UCI through each target PUCCH resource within a slot in the above embodiments is also applicable.

In an embodiment, the method includes the following:

In 111: a transmission order of the target PUCCH resources is determined according to an index value of the target PUCCH resources contained in the target resource set and indicated by the PRI;
  alternatively, a transmission order of the target PUCCH resources is determined according to an index value of the first higher-layer parameter associated with the target resource set to which the target PUCCH resources indicated by the PRI belong;
  alternatively, a transmission order of the target PUCCH resources is determined according to an indication order of the target PUCCH resources contained in the target resource set and indicated by the PRI;
  alternatively, a transmission order of the target PUCCH resources is determined according to an index value of the start symbol of the target PUCCH resources indicated by the PRI.

In this embodiment, the DCI indicates multiple target PUCCH resources, and the transmission order of the target PUCCH resources may be determined in the following manner.

1) The transmission order is determined according to the index value of the target PUCCH resources indicated by the PRI. For example, the transmission order may be arranged in ascending order according to the index values of the PUCCH resources contained in the PUCCH resource groups and indicated by the PRI. In Table 1, when the PRI indicates 000, the order of the target PUCCH resources is PUCCH resource 0 and PUCCH resource 4; when the PRI indicates 100, the order of the target PUCCH resources is PUCCH resource 2 and PUCCH resource 4.

2) The transmission order of the target PUCCH resources is determined according to the index value of the first higher-layer parameter associated with the target resource set to which the target PUCCH resources indicated by the PRI belong. For example, as shown in FIG. 2, PUCCH resource set 2 with first high-layer parameter index 0 (CORESETPoolIndex=0) and PUCCH resource set 6 with first high-layer parameter index 1 (CORESETPoolIndex=1) are selected according to the payload size of the UCI. When the PRI indicates 111, the order of the target PUCCH resources is PUCCH resource 6 in the PUCCH resource set 2 and PUCCH resource 4 in the PUCCH resource set 6.

3) The transmission order of the target PUCCH resources is determined according to an indication order of the target PUCCH resources contained in the target resource set and indicated by the PRI. For example, the transmission order may be arranged according to the indication order of the PUCCH resources contained in the PUCCH resource groups and indicated by the PRI. In Table 1, when the PRI indicates 000, the order of the target PUCCH resources is PUCCH resource 0 and PUCCH resource 4; and when the PRI indicates 100, the order of the target PUCCH resources is PUCCH resource 4 and PUCCH resource 2.

4) The transmission order is determined according to the index value of the start symbol of the target PUCCH resources indicated by the PRI.

For example, if the indexes of the start symbols corresponding to the two target PUCCH resources indicated by the PRI are symbol 2 and symbol 5, respectively, the target PUCCH resource whose start symbol is symbol 2 is preferentially transmitted.

It should be noted that when the target PUCCH resources include more than two PUCCH resources, the method where the communication node determines the transmission order of the target PUCCH resources in the above embodiments is also applicable.

In an embodiment, 120 includes the operations described below.

In a case where a target PUCCH resource configured with the number of transmission repetitions and a target PUCCH resource configured with no transmission repetition overlap in the time domain, in a slot where an overlap occurs, the UCI is transmitted through the target PUCCH resource configured with no transmission repetition, and in a slot where no overlap occurs, the UCI is transmitted through the target PUCCH resource configured with the number of transmission repetitions.

In an embodiment, 120 includes the operations described below.

In a case where a target PUCCH resource configured with the number of transmission repetitions and a target PUCCH resource configured with no transmission repetition overlap in the time domain, in a slot where an overlap occurs, the UCI is transmitted through the target PUCCH resource configured with no transmission repetition; and the slot where the overlap occurs is counted in the number of transmission repetitions of the target PUCCH resources configured with the number of transmission repetitions; or, the slot where the overlap occurs is not counted in the number of transmission repetitions of the target PUCCH resources configured with the number of transmission repetitions.

Figure 10:
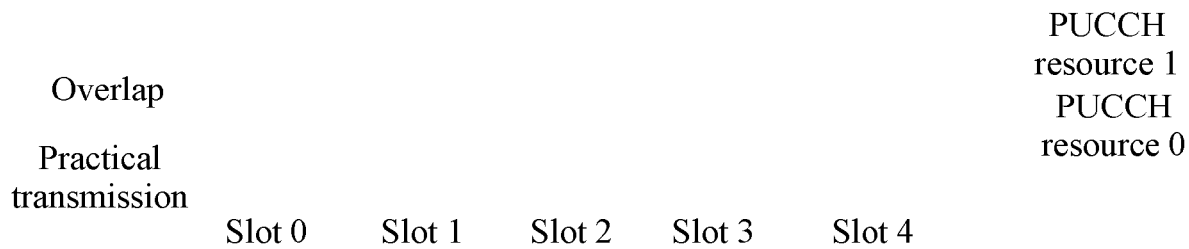
FIG. 10 is a diagram illustrating a situation in which target uplink control resources configured with transmission repetitions are transmitted in delay when an overlap occurs in the time domain according to an embodiment.

FIG. 10 is a diagram illustrating a situation in which target uplink control resources configured with transmission repetitions are transmitted in delay when an overlap occurs in the time domain according to an embodiment. As shown in FIG. 10, PUCCH resource 0 and PUCCH resource 1 overlap in slot 1, and PUCCH resource 1 is not configured with a transmission repetition and is only transmitted once in slot 1. In a practical transmission process, the slot where an overlap occurs is not counted in the number of transmission repetitions of PUCCH resource 0, and the UCI is transmitted only through PUCCH resource 1 in slot 1. PUCCH resource 0 is not transmitted in slot 1, and the remaining transmission repetitions are delayed by one slot.

Figure 11:
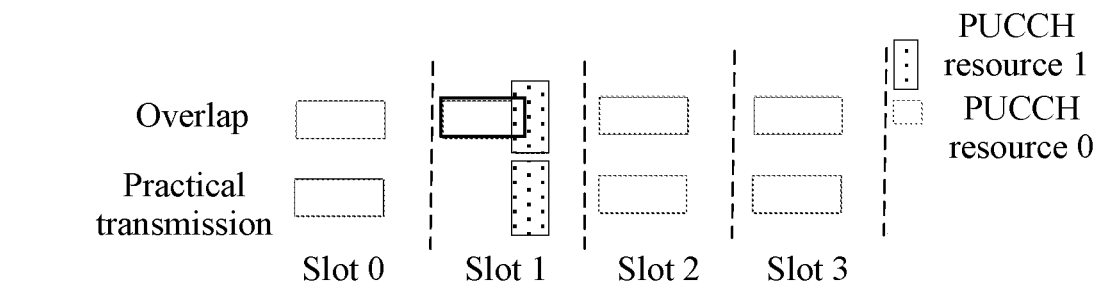
FIG. 11 is a diagram illustrating a situation in which target PUCCH resources configured with transmission repetitions are transmitted without delay when an overlap occurs in the time domain according to an embodiment.

In the embodiment, FIG. 11 is a diagram illustrating a situation in which target PUCCH resources configured with transmission repetitions are transmitted without delay when an overlap occurs in the time domain according to an embodiment. As shown in FIG. 11, PUCCH resource 0 and PUCCH resource 1 overlap in slot 1, and PUCCH resource 1 is not configured with a transmission repetition and is only transmitted once in slot 1. In the practical process, the slot where an overlap occurs is counted in the number of transmission repetitions of PUCCH resource 0, the UCI is transmitted only through PUCCH resource 1 in slot 1, and PUCCH resource 0 is not transmitted in slot 1.

If the slot where an overlap occurs is counted in the number of transmission repetitions of PUCCH resource 0, the remaining transmission repetitions of PUCCH resource 0 are normally performed. For example, the number of transmission repetitions of PUCCH resource 0 is A, and transmission is performed once in slot 0 and slot 1 separately, then A transmission repetitions may be completed after transmission is performed once separately in A—2 slots after slot 1 (referring to FIG. 11).

If the slot where an overlap occurs is not counted in the number of transmission repetitions of PUCCH resource 0, for example, PUCCH resource 0 is transmitted once in slot 0 and is dropped in slot 1, PUCCH resource 0 is transmitted once in A—1 slots separately after slot 1 to complete the A transmission repetitions (referring to FIG. 10).

In an embodiment, 120 includes the operations described below.

In a case where a target PUCCH resource configured with the number of transmission repetitions and a target PUCCH resource configured with no transmission repetition overlap in the time domain, in a slot where an overlap occurs, an overlapping symbol of the target PUCCH resource configured with the transmission repetition is dropped, and the UCI is transmitted through the remaining symbol of the target PUCCH resource configured with the transmission repetition and the target PUCCH resource configured with no transmission repetition.

In this embodiment, in the slot where an overlap occurs, the UCI is transmitted through the target PUCCH resource configured with no transmission repetition and the remaining symbols of the target PUCCH resource configured with the transmission repetition.

Figure 12:
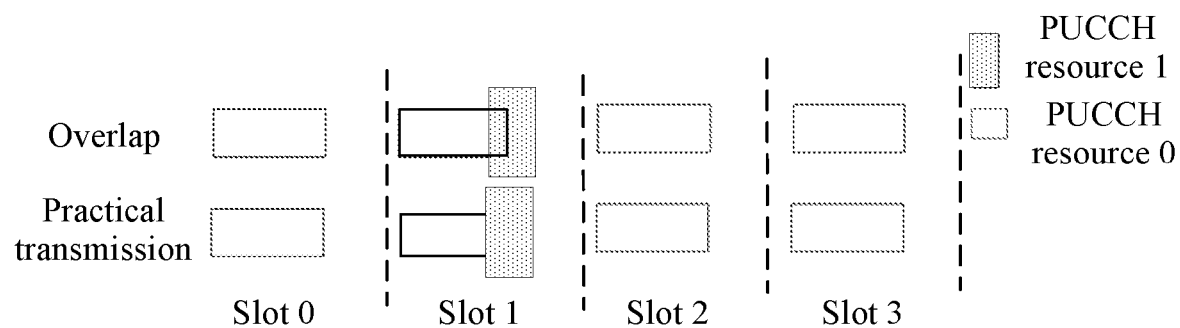
FIG. 12 is a diagram illustrating a situation in which overlapping symbols of target PUCCH resources configured with transmission repetitions are dropped when an overlap occurs in the time domain according to an embodiment.

FIG. 12 is a diagram illustrating a situation in which overlapping symbols of target PUCCH resources configured with transmission repetitions are dropped when an overlap occurs in the time domain according to an embodiment. As shown in FIG. 12, PUCCH resource 0 and PUCCH resource 1 overlap in slot 1, and PUCCH resource 1 is not configured with a transmission repetition and is only transmitted once in slot 1. Then, in a practical transmission process, the UCI is transmitted through PUCCH resource 0 and PUCCH resource 1 in slot 1, and the overlapping symbols in PUCCH resource 0 are dropped.

It should be noted that when the target PUCCH resources include more than two PUCCH resources, and the target PUCCH resource configured with the number of transmission repetitions and the target PUCCH resource configured with no transmission repetition overlap in the time domain, the method where the communication node transmits, in a slot where an overlap occurs, the UCI through the target PUCCH resource configured with no transmission repetition in the preceding embodiments is also applicable.

Figure 13:
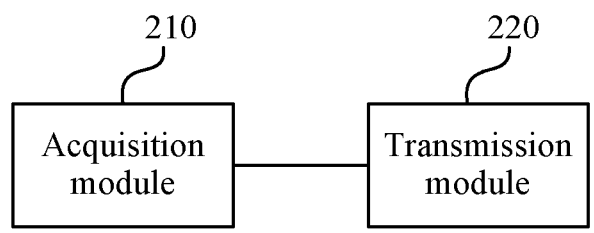
FIG. 13 is a diagram illustrating the structure of a control information transmission apparatus according to an embodiment.

This embodiment also provides a control information transmission apparatus. FIG. 13 is a diagram illustrating the structure of a control information transmission apparatus according to an embodiment. As shown in FIG. 13, the control information transmission apparatus includes an acquisition module 210 and a transmission module 220.

The acquisition module 210 is configured to acquire downlink control information, where the downlink control information is configured to indicate at least two target uplink control channel resources in a target resource set.

The transmission module 220 is configured to transmit uplink control information based on the target uplink control channel resources.

In the control information transmission apparatus of this embodiment, the DCI indicates at least two target PUCCH resources in the target resource set for transmitting the uplink control information, thereby improving the transmission diversity gain and flexibility of the uplink control information.

In an embodiment, the target resource set is determined by a payload size of uplink control information. At least one target resource set is provided. The uplink control channel resources are indicated by an uplink control channel resource indicator of the downlink control information.

In an embodiment, the control information transmission apparatus also includes a first resource set determination module.

The first resource set determination module is configured to: determine one target resource set based on the payload size of the uplink control information; divide uplink control channel resources in the one target resource set into at least two groups, and use the uplink control channel resource indicator to indicate that one of at least two groups of the uplink control channel resources in the one target resource set serves as the target uplink control channel resources.

In an embodiment, the control information transmission apparatus also includes a second resource set determination module.

The second resource set determination module is configured to: determine at least two target resource sets based on the payload size of the uplink control information; and use the uplink control channel resource indicator to indicate that one uplink control channel resource in the target resource set serves as the target uplink control channel resource.

In an embodiment, the control information transmission apparatus also includes A candidate resource set determination module.

The candidate resource set determination module is configured to associate a candidate resource set with a first higher-layer parameter, and the target resource set belongs to the candidate resource set.

In an embodiment, the downlink control information is also configured to indicate the number of transmission repetitions of the target uplink control channel resources.

In an embodiment, the downlink control information indicates one value of the number of transmission repetitions. The number of transmission repetitions is the total number of transmission repetitions of the target uplink control channel resources. The total number is the sum of the respective number of transmission repetitions of each target uplink control channel resource.

The target uplink control channel resources are not repeatedly transmitted by default in a case where the downlink control information does not indicate the number of transmission repetitions.

In an embodiment, the downlink control information indicates one value of the number of transmission repetitions. The number of transmission repetitions is the number of transmission repetitions of each uplink control channel resource in the target uplink control channel resources.

The target uplink control channel resources are not repeatedly transmitted by default in a case where the downlink control information does not indicate the number of transmission repetitions.

In an embodiment, the number of transmission repetitions of the target uplink control channel resources is configured by a second higher-layer parameter.

The second higher-layer parameter is configured to configure the number of transmission repetitions of each uplink control channel resource, or the number of transmission repetitions corresponding to an uplink control channel resource set. The number of transmission repetitions is applied to transmission of each uplink control channel resource in the uplink control channel resource set.

In an embodiment, the target uplink control channel resources include a first resource and a second resource which overlap in the time domain.

In an embodiment, the transmission module 220 is configured to perform the operations described below.

The uplink control information is transmitted in each slot through the first resource and the second resource, where for different slots, an overlapping symbol in the first resource or the second resource is dropped alternately.

Alternatively, N transmissions of the target uplink control channel resources are divided into M groups, and the uplink control information is transmitted in each slot through the first resource and the second resource, where for different groups, an overlapping symbol in the first resource or the second resource is dropped alternately. N is an integer greater than or equal to 2, and M is an integer greater than or equal to 2.

In an embodiment, in a slot where an overlap occurs, a first frequency hopping unit corresponds to the first resource, and an index of a physical resource block of the first resource is indicated by a third higher-layer parameter; a second frequency hopping unit corresponds to the second resource, and an index of a physical resource block of the second resource is indicated by a fourth higher-layer parameter.

In an embodiment, the transmission module 220 is configured to perform the operations described below.

In different slots, the uplink control information is transmitted through the first resource or the second resource alternately.

Alternately, N transmissions of the target uplink control channel resources are divided into M groups, and in different groups, the uplink control information is transmitted through the first resource or the second resource alternately. N is an integer greater than or equal to 2, and M is an integer greater than or equal to 2.

In an embodiment, the target uplink control channel resources include a first resource and a second resource. In a case where the intra-slot frequency hopping is configured, a first frequency hopping unit corresponds to the first resource, and an index of a physical resource block of the first resource is indicated by a third higher-layer parameter; a second frequency hopping unit corresponds to the second resource, and an index of a physical resource block of the second resource is indicated by a fourth higher-layer parameter.

In an embodiment, the target uplink control channel resources include a first resource and a second resource.

The number of transmission repetitions of the target uplink control channel resources is only semi-statically indicated by a fifth higher-layer parameter.

In an embodiment, the transmission module 220 is configured to perform the operations described below.

In a case where the value of the fifth higher-layer parameter is 1, the uplink control information is transmitted in the same slot through the first resource and the second resource.

In a case where the value of the fifth higher-layer parameter is greater than 1, inter-slot transmission repetitions are performed on the first resource and the second resource, and in different slots, the uplink control information is transmitted through the first resource or the second resource separately.

In an embodiment, the target uplink control channel resources include a first resource and a second resource.

The number of transmission repetitions of the target uplink control channel resources is indicated jointly by a fifth higher-layer parameter and downlink control information.

In an embodiment, in a case where the number of transmission repetitions indicated by the fifth higher-layer parameter is equal to N and the number of transmission repetitions indicated by the downlink control information is twice the number of transmission repetitions indicated by the fifth higher-layer parameter, the uplink control information is transmitted in the same slot through the first resource and the second resource, and inter-slot transmission repetitions are performed on N slots.

In a case where the number of transmission repetitions indicated by the fifth higher-layer parameter is equal to the number of transmission repetitions indicated by the downlink control information, inter-slot transmission repetitions are performed on the first resource and the second resource, and in different slots, the uplink control information is transmitted through the first resource or the second resource separately.

In a case where the number of transmission repetitions indicated by the downlink control information is not twice and not equal to the number of transmission repetitions indicated by the fifth higher-layer parameter, in different slots, the uplink control information is transmitted through the first resource or the second resource separately, and inter-slot transmission repetitions are performed on the first resource and the second resource, where the number of transmission repetitions is determined according to the downlink control information.

In an embodiment, the target uplink control channel resources include a first resource and a second resource. The number of transmission repetitions of the target uplink control channel resources is dynamically indicated only by the downlink control information.

The transmission module 220 is configured to perform the operations described below.

In a case where the number of transmission repetitions dynamically indicated by the DCI is 1, the uplink control information is transmitted once through the first resource or the second resource.

In a case where the number of transmission repetitions dynamically indicated by the DCI is 2, in response to absence of a time domain overlap between the first resource and the second resource, the uplink control information is transmitted in the same slot through the first resource and the second resource.

In a case where the number of transmission repetitions dynamically indicated by the downlink control information is 2, in response to a time domain overlap between the first resource and the second resource, inter-slot transmission repetitions are performed on the first resource and the second resource, and in different slots, the UCI is transmitted through the first resource or the second resource separately.

In a case where the number of transmission repetitions dynamically indicated by the DCI is greater than 2, inter-slot transmission repetitions are performed on the first resource and the second resource, and in different slots, the UCI is transmitted through the first resource or the second resource separately.

In an embodiment, the control information transmission apparatus also includes an order determination module configured to perform the operations described below.

A transmission order of the target uplink control channel resources is determined according to an index value of the target uplink control channel resources contained in the target resource set and indicated by an uplink control channel resource indicator.

Alternatively, a transmission order of the target uplink control channel resources is determined according to an index value of a first higher-layer parameter associated with the target resource set to which the target uplink control channel resources indicated by an uplink control channel resource indicator belong.

Alternatively, a transmission order of the target uplink control channel resources is determined according to an indication order of the target uplink control channel resources contained in the target resource set and indicated by an uplink control channel resource indicator.

Alternatively, a transmission order of the target uplink control channel resources is determined according to an index value of a start symbol of the target uplink control channel resources indicated by an uplink control channel resource indicator.

In an embodiment, the transmission module 220 is configured to perform the operations described below.

In a case where a target uplink control channel resource configured with the number of transmission repetitions and a target uplink control channel resource configured with no transmission repetition overlap in the time domain, in a slot where an overlap occurs, the uplink control information is transmitted through the target uplink control channel resources configured with no transmission repetition, and in a slot where no overlap occurs, the uplink control information is transmitted through the target uplink control channel resources configured with the transmission repetition.

In an embodiment, the transmission module 220 is configured to perform the operations described below.

In a case where a target uplink control channel resource configured with the number of transmission repetitions and a target uplink control channel resource configured with no transmission repetition overlap in the time domain, in a slot where an overlap occurs, an overlapping symbol of the target uplink control channel resource configured with the transmission repetition is dropped, and the uplink control information is transmitted through the remaining symbols of the target uplink control channel resource configured with the transmission repetition and the target uplink control channel resource configured with no transmission repetition.

In an embodiment, the transmission module 220 is configured to perform the operations described below.

In a case where a target uplink control channel resource configured with the number of transmission repetitions and a target uplink control channel resource configured with no transmission repetition overlap in the time domain, in a slot where an overlap occurs, the uplink control information is transmitted through the target uplink control channel resource configured with no transmission repetition.

The slot where an overlap occurs is counted in the number of transmission repetitions of the target uplink control channel resource configured with a transmission repetition; or the slot where an overlap occurs is not counted in the number of transmission repetitions of the target uplink control channel resource configured with a transmission repetition.

The control information transmission apparatus provided in this embodiment and the control information transmission method provided in the preceding embodiments belong to the same concept. For technical details not described in detail in this embodiment, reference may be made to any one of the preceding embodiments. The embodiment has the same beneficial effects as the applied control information transmission method.

This embodiment of the present application also provides a communication node. The control information transmission method may be performed by the control information transmission apparatus which may be implemented by software and/or hardware and integrated in the communication node. The communication node may be a network-side device, such as a base station, an access point, or user equipment.

The communication includes one or more processors configured to perform, upon execution, the control information transmission method according to any of the preceding embodiments.

Figure 14:
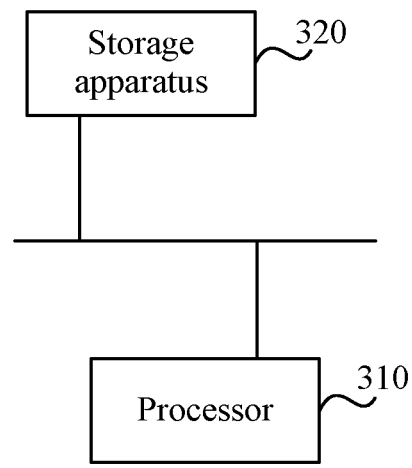
FIG. 14 is a diagram illustrating the hardware structure of a communication node according to an embodiment.

FIG. 14 is a diagram illustrating the hardware structure of a communication node according to an embodiment. As shown in FIG. 14, the communication node provided in the embodiment includes a processor 310 and a storage device 320. The communication node may include one or more processors. One processor 310 is shown as an example in FIG. 14. The processor 310 and the storage device 320 in the equipment may be connected via a bus or in other manners. The connection via the bus is shown as an example in FIG. 14.

One or more programs are executed by one or more processors 310, causing the one or more processors to perform the control information transmission method in any one of the preceding embodiments.

The storage device 320 in the communication node, as a computer-readable storage medium, may be configured to store one or more programs which may be software programs, computer-executable programs and modules, such as program instructions/modules (for example, modules in the control information transmission apparatus, including the acquisition module 210 and the transmission module 220, as shown in FIG. 13) corresponding to the control information transmission method in embodiments of the present application. The processor 310 executes software programs, instructions, and modules stored in the storage device 320 to perform various function applications and data processing of the communication node, that is, to implement the control information transmission method in the preceding method embodiments.

The storage device 320 mainly includes a program storage region and a data storage region. The program storage region may store an operating system and an application program required by at least one function. The data storage region may store data (such as the downlink control information and the uplink control information in the preceding embodiments) created based on use of the device. Additionally, the storage device 320 may include a high-speed random-access memory and may also include a non-volatile memory, such as at least one magnetic disk memory, a flash memory or another non-volatile solid-state memory. In some examples, the storage device 320 may also include memories which are remotely disposed with respect to the processor 310.

These remote memories may be connected to the communication node via a network. Examples of the preceding network include, but are not limited to, the Internet, an intranet, a local area network, a mobile communication network and a combination thereof.

And, when one or more programs included in the communication node are executed by the one or more processor 310, the following operations are implemented. Downlink control information is acquired, where the downlink control information is configured to indicate at least two target uplink control channel resources in a target resource set, and uplink control information is transmitted based on the target uplink control channel resources.

The communication node provided in this embodiment and the control information transmission method provided in the preceding embodiments belong to the same concept. For technical details not described in detail in this embodiment, reference may be made to any one of the preceding embodiments. The embodiment has the same beneficial effects as the applied control information transmission method.

Embodiments of the present application also provide a storage medium containing computer-executable instructions which, when executed by a computer processor, causes the computer processor to perform a control information transmission method.

The method includes acquiring downlink control information, where the downlink control information is configured to indicate at least two target uplink control channel resources in a target resource set, and transmitting uplink control information based on the at least two target uplink control channel resources.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium, such as a floppy disk, a read-only memory (ROM), a random-access memory (RAM), a flash memory, a hard disk, or an optical disk of a computer and includes multiple instructions for enabling a computer device (which may be a personal computer, a server, or a network device) to perform the method in any embodiment of the present application.

The preceding are only example embodiments of the present application and not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for the local technical environment and may be implemented by adopting any suitable data storage technology, such as, but not limited to, a read-only memory (ROM), a random-access memory (RAM), and an optical memory device and system (a digital versatile disc, (DVD) or a compact disc (CD)). Computer-readable media may include non-transitory storage media. The data processor may be of any type suitable for the local technical environment, such as, but not limited to, a general purpose computer, a special purpose computer, a microprocessor, a digital signal processor (DSP), an application specific integrated circuit (ASIC), a field programmable gate array (FPGA), and a processor based on a multi-core processor architecture.

What is claimed is:

1. A control information transmission method, comprising:

acquiring downlink control information, wherein the downlink control information is configured to indicate at least two target uplink control channel resources in a target resource set; and transmitting uplink control information based on the at least two target uplink control channel resources;

wherein the target resource set is determined by a payload size of the uplink control information; at least one target resource set is provided; and the at least two target uplink control channel resources are indicated by an uplink control channel resource indicator of the downlink control information;

wherein a number of transmission repetitions of the at least two target uplink control channel resources is configured by a second higher-layer parameter, wherein the second higher-layer parameter is configured to configure a number of transmission repetitions of each of the at least two uplink control channel resources, or the second higher-layer parameter is configured to configure a number of transmission repetitions corresponding to an uplink control channel resource set, wherein the number of transmission repetitions is applied to transmission of each uplink control channel resource in the uplink control channel resource set.

2. The control information transmission method of claim 1, further comprising:

determining one target resource set based on the payload size of the uplink control information; dividing uplink control channel resources in the one target resource set into at least two groups of uplink control channel resources; and using the uplink control channel resource indicator to indicate that one group of the at least two groups of uplink control channel resources in the one target resource set serve as the at least two target uplink control channel resources; or determining at least two target resource sets based on the payload size of the uplink control information; and using the uplink control channel resource indicator to indicate that one uplink control channel resource in each target resource set of the at least two target resource sets serves as a respective one of the at least two target uplink control channel resources.

3. The control information transmission method of claim 2, further comprising:
associating a candidate resource set with a first higher-layer parameter, wherein the each target resource set belongs to the candidate resource set.

4. The control information transmission method of claim 1, wherein the downlink control information is further configured to indicate a number of transmission repetitions of the at least two target uplink control channel resources.

5. The control information transmission method of claim 4, wherein the downlink control information indicates one value of the number of transmission repetitions, wherein the number of transmission repetitions is a total number of transmission repetitions of the at least two target uplink control channel resources, wherein the total number is a sum of respective numbers of transmission repetitions of the at least two target uplink control channel resources; and wherein in response to the downlink control information not indicating the number of transmission repetitions, the at least two target uplink control channel resources are not repeatedly transmitted by default; or
wherein the downlink control information indicates one value of the number of transmission repetitions, wherein the number of transmission repetitions is a number of transmission repetitions of each uplink control channel resource in the at least two target uplink control channel resources; and wherein in response to the downlink control information not indicating the number of transmission repetitions, the at least two target uplink control channel resources are not repeatedly transmitted by default.

6. The control information transmission method of claim 1, wherein the at least two target uplink control channel resources comprise a first resource and a second resource, wherein the first resource and the second resource overlap in a time domain.

7. The control information transmission method of claim 6, wherein transmitting the uplink control information based on the at least two target uplink control channel resources comprises:
transmitting the uplink control information in each slot through the first resource and the second resource, wherein for different slots, an overlapping symbol in the first resource or in the second resource is dropped alternately; or
dividing N transmissions of the at least two target uplink control channel resources into M groups, and transmitting the uplink control information in each slot through the first resource and the second resource, wherein for different groups of the M groups, an overlapping symbol in the first resource or in the second resource is dropped alternately, wherein N is an integer greater than or equal to 2, and M is an integer greater than or equal to 2.

8. The control information transmission method of claim 6, wherein transmitting the uplink control information based on the at least two target uplink control channel resources comprises:
in different slots, alternately transmitting the uplink control information through the first resource or the second resource; or
dividing N transmissions of the at least two target uplink control channel resources into M groups, and alternately transmitting, in different groups of the M groups, the uplink control information through the first resource or the second resource, wherein N is an integer greater than or equal to 2, and M is an integer greater than or equal to 2.

9. The control information transmission method of claim 1, wherein the at least two target uplink control channel resources comprise a first resource and a second resource, wherein in response to an intra-slot frequency hopping being configured, a first frequency hopping unit corresponds to the first resource, and an index of a physical resource block of the first resource is indicated by a third higher-layer parameter; and a second frequency hopping unit corresponds to the second resource, and an index of a physical resource block of the second resource is indicated by a fourth higher-layer parameter.

10. The control information transmission method of claim 1, wherein the at least two target uplink control channel resources comprise a first resource and a second resource, and
a number of transmission repetitions of the at least two target uplink control channel resources is semi-statically indicated by a fifth higher-layer parameter;
wherein transmitting the uplink control information based on the at least two target uplink control channel resources comprises:
in response to a value of the fifth higher-layer parameter being 1, transmitting the uplink control information in a same slot through the first resource and the second resource; and
in response to the value of the fifth higher-layer parameter being greater than 1, performing inter-slot transmission repetitions on the first resource and the second resource, and in different slots, transmitting the uplink control information through the first resource or the second resource separately.

11. The control information transmission method of claim 1, wherein the at least two target uplink control channel resources comprise a first resource and a second resource, and
a number of transmission repetitions of the at least two target uplink control channel resources is indicated jointly by a fifth higher-layer parameter and the downlink control information;
wherein transmitting the uplink control information based on the at least two target uplink control channel resources comprises:
in response to a number of transmission repetitions indicated by the fifth higher-layer parameter being equal to N and in response to a number of transmission repetitions indicated by the downlink control information being twice the number of transmission repetitions indicated by the fifth higher-layer parameter, transmitting the uplink control information in a same slot through the first resource and the second resource, and performing inter-slot transmission repetitions on N slots;
in response to the number of transmission repetitions indicated by the fifth higher-layer parameter being equal to the number of transmission repetitions indicated by the downlink control information, performing inter-slot transmission repetitions on the first resource and the second resource, and in different slots, transmitting the uplink control information through the first resource or the second resource separately; and
in response to the number of transmission repetitions indicated by the downlink control information not being twice the number of transmission repetitions indicated by the fifth higher-layer parameter and in response to the number of transmission repetitions indicated by the downlink control information not being equal to the number of transmission repetitions indicated by the fifth higher-layer parameter, in different slots, transmitting the uplink control information through the first resource or the second resource separately, and performing inter-slot transmission repetitions on the first resource and the second resource.

12. The control information transmission method of claim 1, wherein the at least two target uplink control channel resources comprise a first resource and a second resource, and
a number of transmission repetitions of the at least two target uplink control channel resources is dynamically indicated only by the downlink control information, wherein
in response to the number of transmission repetitions dynamically indicated by the downlink control information being 1, transmitting the uplink control information once through the first resource or the second resource;
in response to the number of transmission repetitions dynamically indicated by the downlink control information being 2, and in response to absence of a time domain overlap between the first resource and the second resource, transmitting the uplink control information in a same slot through the first resource and the second resource;
in response to the number of transmission repetitions dynamically indicated by the downlink control information being 2, and in response to existence of a time domain overlap between the first resource and the second resource, performing inter-slot transmission repetitions on the first resource and the second resource, and transmitting the uplink control information in different slots through the first resource or the second resource separately; and
in response to the number of transmission repetitions dynamically indicated by the downlink control information being greater than 2, performing inter-slot transmission repetitions on the first resource and the second resource, and transmitting the uplink control information in different slots through the first resource or the second resource separately.

13. The control information transmission method of claim 1, further comprising one of:
determining a transmission order of the at least two target uplink control channel resources according to an index size of the at least two target uplink control channel resources contained in the target resource set and indicated by an uplink control channel resource indicator;
determining a transmission order of the at least two target uplink control channel resources according to an index size of a first higher-layer parameter associated with the target resource set to which the at least two target uplink control channel resources indicated by an uplink control channel resource indicator belong;
determining a transmission order of the at least two target uplink control channel resources according to an indication order of the at least two target uplink control channel resources contained in the target resource set and indicated by an uplink control channel resource indicator; or
determining a transmission order of the at least two target uplink control channel resources according to index sizes of start symbols of the at least two target uplink control channel resources indicated by an uplink control channel resource indicator.

14. The control information transmission method of claim 1, wherein transmitting the uplink control information based on the at least two target uplink control channel resources comprises:
in response to an overlap between a target uplink control channel resource configured with a number of transmission repetitions and a target uplink control channel resource without a configured number of transmission repetitions occurring in a time domain, transmitting, in a slot where the overlap occurs, the uplink control information through the target uplink control channel resource without the configured number of transmission repetitions, and transmitting, in a slot where no overlap occurs, the uplink control information through the target uplink control channel resource configured with the number of transmission repetitions.

15. The control information transmission method of claim 1, wherein transmitting the uplink control information based on the at least two target uplink control channel resources comprises:
in response to an overlap between a target uplink control channel resource configured with a number of transmission repetitions and a target uplink control channel resource without a configured number of transmission repetitions occurring in a time domain, in a slot where the overlap occurs, dropping an overlapping symbol of the target uplink control channel resource configured with the number of transmission repetitions, and transmitting the uplink control information through the target uplink control channel resource without the configured number of transmission repetitions and a remaining symbol of the target uplink control channel resource configured with the number of transmission repetitions.

16. The control information transmission method of claim 1, wherein transmitting the uplink control information based on the at least two target uplink control channel resources comprises:
in response to an overlap between a target uplink control channel resource configured with a number of transmission repetitions and a target uplink control channel resource without a configured number of transmission repetitions occurring in a time domain, transmitting, in a slot where the overlap occurs, the uplink control information through the target uplink control channel resource without the configured number of transmission repetitions,
counting the slot where the overlap occurs in a number of transmission repetitions of the target uplink control channel resource configured with a number of transmission repetitions, or
not counting the slot where the overlap occurs in a number of transmission repetitions of the target uplink control channel resource configured with a number of transmission repetitions.

17. A communication node, comprising:
at least one processor and a memory, wherein the memory stores a computer program which, when executed by the at least one processor, causes the at least one processor to perform:
acquiring downlink control information, wherein the downlink control information is configured to indicate at least two target uplink control channel resources in a target resource set; and transmitting uplink control information based on the at least two target uplink control channel resources;

wherein the target resource set is determined by a payload size of the uplink control information; at least one target resource set is provided; and the at least two target uplink control channel resources are indicated by an uplink control channel resource indicator of the downlink control information;

wherein a number of transmission repetitions of the at least two target uplink control channel resources is configured by a second higher-layer parameter, wherein the second higher-layer parameter is configured to configure a number of transmission repetitions of each of the at least two uplink control channel resources, or the second higher-layer parameter is configured to configure a number of transmission repetitions corresponding to an uplink control channel resource set, wherein the number of transmission repetitions is applied to transmission of each uplink control channel resource in the uplink control channel resource set.

18. A non-transitory computer-readable storage medium storing a computer program which, when executed by a processor, causes the processor to perform:

acquiring downlink control information, wherein the downlink control information is configured to indicate at least two target uplink control channel resources in a target resource set; and transmitting uplink control information based on the at least two target uplink control channel resources;

wherein the target resource set is determined by a payload size of the uplink control information; at least one target resource set is provided; and the at least two target uplink control channel resources are indicated by an uplink control channel resource indicator of the downlink control information;

wherein a number of transmission repetitions of the at least two target uplink control channel resources is configured by a second higher-layer parameter, wherein the second higher-layer parameter is configured to configure a number of transmission repetitions of each of the at least two uplink control channel resources, or the second higher-layer parameter is configured to configure a number of transmission repetitions corresponding to an uplink control channel resource set, wherein the number of transmission repetitions is applied to transmission of each uplink control channel resource in the uplink control channel resource set.

19. The communication node of claim 17, wherein the at least one processor is caused to further perform:

determining one target resource set based on the payload size of the uplink control information; dividing uplink control channel resources in the one target resource set into at least two groups of uplink control channel resources; and using the uplink control channel resource indicator to indicate that one group of the at least two groups of uplink control channel resources in the one target resource set serve as the at least two target uplink control channel resources; or determining at least two target resource sets based on the payload size of the uplink control information; and using the uplink control channel resource indicator to indicate that one uplink control channel resource in each target resource set of the at least two target resource sets serves as a respective one of the at least two target uplink control channel resources.

20. The communication node of claim 19, wherein the at least one processor is caused to further perform:

associating a candidate resource set with a first higher-layer parameter, wherein the each target resource set belongs to the candidate resource set.

\* \* \* \* \*